United States Patent
Pontoppidan et al.

[11] 4,010,459
[45] Mar. 1, 1977

[54] SYSTEMS FOR THE DETECTION OF MOVING OBJECTS WITHIN A SURVEY AREA BY MICROWAVE DIFFRACTION

[75] Inventors: Jørgen Pontoppidan; Erik Tue Sørensen, both of Lyngby; Erik Kjaer Nielsen, Ballerup, all of Denmark

[73] Assignees: Børge Schløger; Oluf Tvede-Jensen; Erik Landert; Hans Børge Hansen; Niels Ove Wrist, all of Denmark

[22] Filed: Nov. 5, 1975

[21] Appl. No.: 628,973

[30] Foreign Application Priority Data
Nov. 7, 1974    Denmark .............................. 5815/74

[52] U.S. Cl. .......................... 340/258 A; 333/70 A; 340/258 D
[51] Int. Cl.² ......................................... G08B 13/24
[58] Field of Search .......... 340/258 A, 258 D, 280, 340/258 R; 333/70 A

[56] References Cited
UNITED STATES PATENTS

| | | | |
|---|---|---|---|
| 3,569,923 | 3/1971 | Naubereit et al. ............. | 340/258 D |
| 3,725,888 | 4/1973 | Solomon ........................ | 340/258 A |
| 3,761,816 | 9/1973 | Condon ............................ | 333/70 A |
| 3,877,002 | 4/1975 | Cheal et al. .................... | 340/258 R |

FOREIGN PATENTS OR APPLICATIONS
1,210,181   10/1970   United Kingdom ............. 333/70 A

OTHER PUBLICATIONS

Langer, V. E. "Zeitmultiplexverfahren zur Filtersynthese" *Frequenz* BD 20, Nr. 12, 1966.

*Primary Examiner*—Glen R. Swann, III
*Attorney, Agent, or Firm*—Watson, Cole, Grindle & Watson

[57] ABSTRACT

A microwave transmitter and receiver are placed at a distance from each other to define between them a survey area in which the field of transmission is modified by reflection and/or absorption by objects in the survey area. A modulation generator is used for controlling modulation in the transmitter and for controlling the cycling period of a commutative filter in the receiver in accordance with the modulation period, thereby automatically tuning the receiver to the transmitter. The receiver further comprises an alarm unit which analyses the signal admitted through the commutative filter and strikes an alarm in response to such changes of that signal as are caused by the presence of moving objects in the survey area.

6 Claims, 5 Drawing Figures

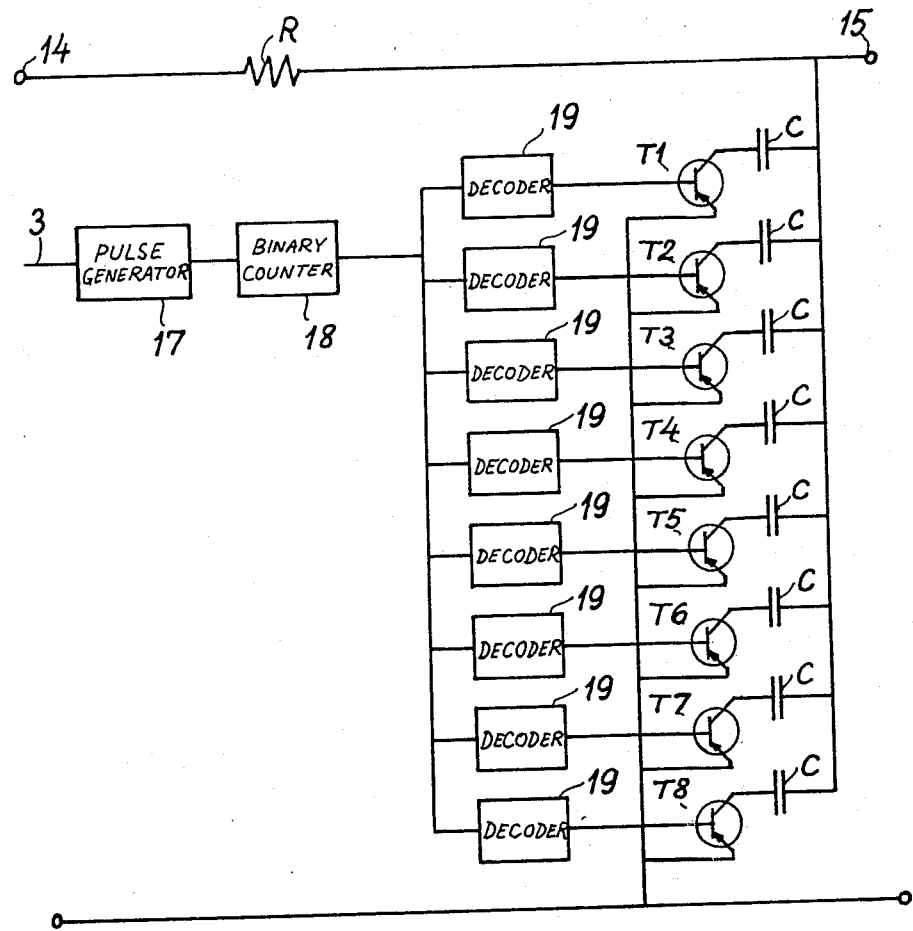
Fig. 3
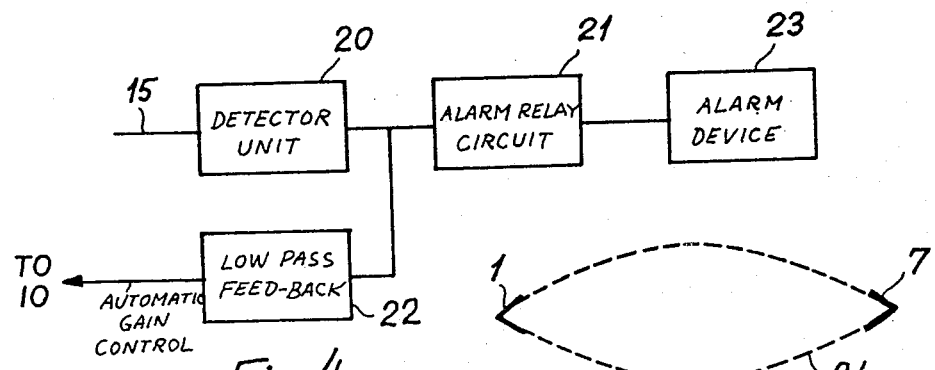
Fig. 4
Fig. 5

SYSTEMS FOR THE DETECTION OF MOVING OBJECTS WITHIN A SURVEY AREA BY MICROWAVE DIFFRACTION

BACKGROUND OF THE INVENTION

This invention relates to a system for the detection of moving objects within a survey area by microwave diffraction. Such a detection system includes a transmitter and a receiver. The transmitter includes a microwave oscillator, a modulator and a transmitter antenna. The receiver includes a receiving antenna, a detector, an amplifier a filter for the detected signal, an alarm unit connected to the output of the filter, a modulator and a modulation generator for controlling the modulator.

In such a system, the signal emitted by the transmitting antenna is modified by reflection and/or absorption by both stationary and moving objects in the survey area before reaching the receiving antenna, and a change of the signal received by the latter will therefore be an indication that a moving object, such as a person, is present in the survey area.

If such a system is constructed on the basis of conventional components, these must be of very high quality, and therefore expensive, or the system must continually be checked and adjusted to ensure that no mutual drifting of the transmitter and receiver takes place, which may give rise to a false alarm or failing alarm.

SUMMARY OF THE INVENTION

It is an object of the invention to avoid these drawbacks. With this in view, according to the invention, there is a commutative filter having a number of capacitors which are cyclically connectable as filter shunt capacitors in a cycle controlled by the modulation generator, the cycling period being equal to the modulation period. For establishing this control, the transmitter and the receiver are preferably connected by a cable for the transmitter of the modulation generator signal.

A commutative filter of the kind specified has the property of only admitting a narrow frequency band on either side of the cycling frequency and, with decreasing amplitude, its harmonics. Since, according to the invention, the cycling frequency is positively interlocked with the modulation frequency, the receiver will always be accurately tuned to the transmitter irrespective of possible drifting of the carrier frequency or modulation frequency and possible changes of the condition of the components of the receiver. It is therefore possible to make the system from relatively inexpensive components without any requirement of high precision, and these may within reasonable limits be placed under any climatic and thermal conditions without affecting the proper functioning of the system. Since the transmitter and receiver units are not to be adjusted to each other, mounting is extremely simple, and there is practically no need for watching and checking the system. False or failing alarm owing to changes of the electric data of the components is practically eliminated. When changes of the received signal occur in response to the presence of moving objects in the survey area, the transient time of the filter will be negligible in relation to the rate of the signal changes of interest for surveying purposes. Consequently, the signal admitted through the filter can always be taken as truly representative of the modulation content of the signal received at any moment and is therefore suitable for controlling an alarm unit, e.g. in such a manner as to strike an alarm when the amplitude of the signal received, and therefore also that of the filtered signal undergoes a change beyond predetermined limits within a short time. A further advantage is that two or more systems according to the invention may be physically located close together without interfering with each other, e.g. for the purpose of surveying an area from different angles or surveying areas in close proximity to each other.

The modulation signal may advantageously be a rectangular wave signal whereby the modulation may be effected by simple on-off technique. Owing to the special pass-band characteristic of the commutative filter this is particularly suitable for dealing with this waveform because it admits not only the basic modulation frequency, but also its harmonics and therefore passes on a maximum of the modulation energy of the signal, whereby a favourable signal-to-noise ratio is obtained.

BRIEF DESCRIPTION OF THE DRAWINGS

FIG. 3 is a block diagram of a commutative filter having an electronic switching arrangement corresponding to that symbolically illustrated in FIG. 2.

FIG. 4 is a block diagram of the principal components of one form of alarm unit that may be used in the system illustrated in FIG. 1.

FIG. 5 is a diagrammatic illustration of the survey area defined by the transmitter and receiver of a system according to the invention.

DESCRIPTION OF THE PREFERRED EMBODIMENT

Figure 1:
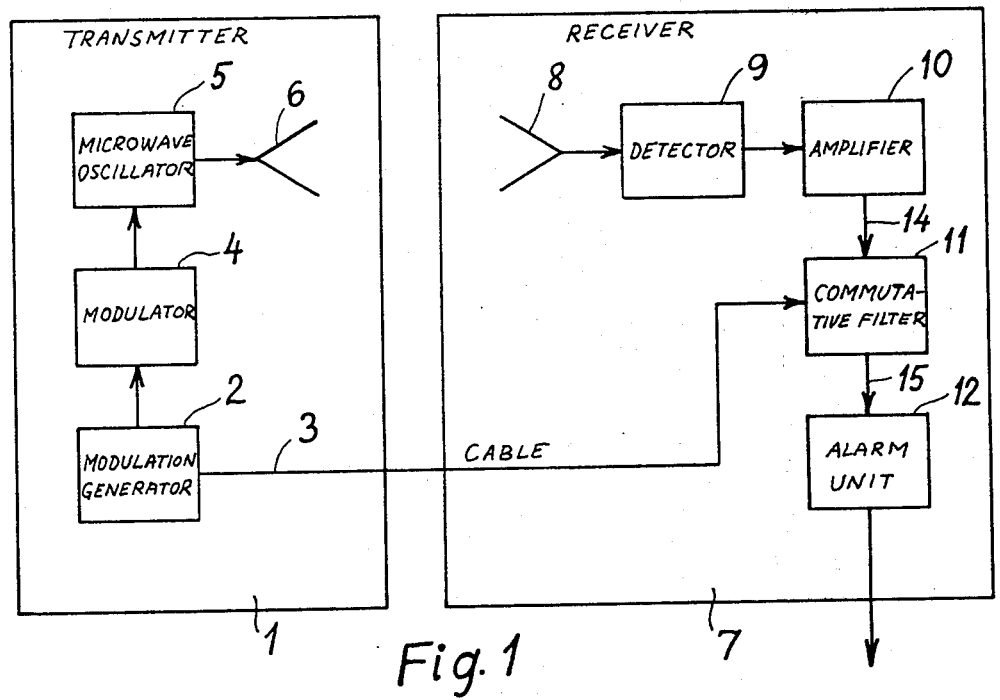
FIG. 1 is a block diagram of a microwave survey system according to one embodiment of the invention.
Figure 2:
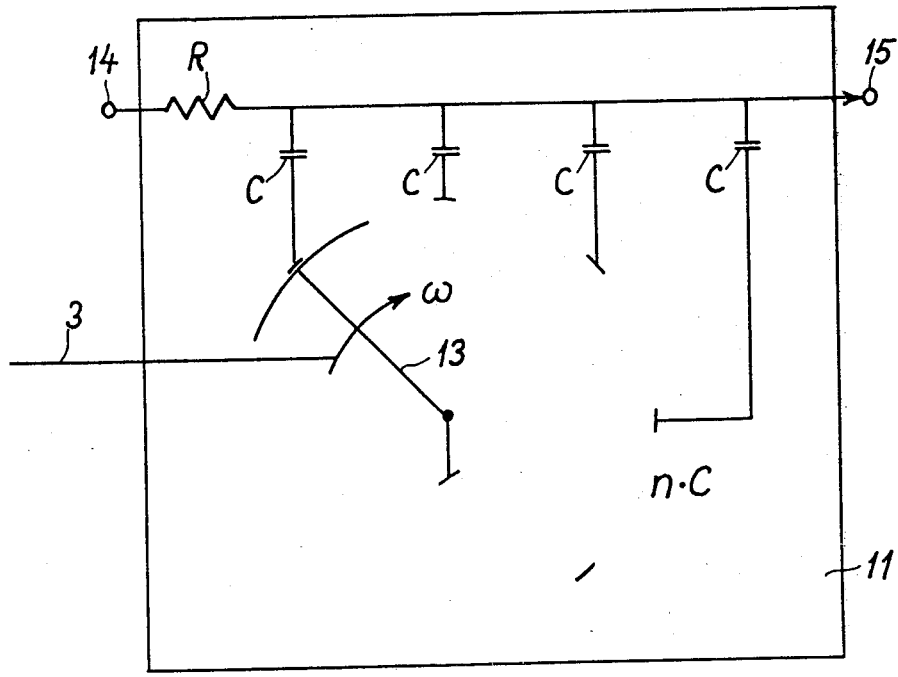
FIG. 2 is a symbolic diagram of a commutative filter forming part of the system of FIG. 1.

The system for the detection of moving objects illustrated in FIG. 1 comprises a transmitter 1 and a receiver 7 interconnected through a cable 3 to be referred to in the following. The transmitter 1 comprises a microwave oscillator 5, such as a 10 GHz Gunn oscillator which is connected with a modulator 4, such as a rectangular wave modulator. The modulator 4 is connected with a modulation generator 2, such as a tone generator having a frequency within the range of 10–100 kHz. In the embodiment illustrated, the modulation generator is located in the cabinet of the transmitter, but it could alternatively be located in the cabinet of the receiver, or in any other place. The modulated microwave signal produced by the oscillator 5 is emitted via a transmitting antenna 6, such as a horn antenna. The receiver 7 comprises a receiving antenna 8, which may likewise be a horn antenna, and which is connected to a detector 9 which is again connected to an amplifier 10. The latter is connected to a filter 11, which may supply a signal to an alarm unit 12. The filter 11, which is a commutative filter — see FIGS. 2 and 3 — is constituted by a series resistor R connected to one terminal of each of a number ($n$) of shunt capacitors C. The other terminals of these capacitors C are connected in cyclic succession to ground through a switching arrangement symbolically represented in FIG. 2 by a switching arm 13 rotating at the modulation frequency of the modulation generator 2. In actual fact the connection of the switching arm 13 with the respective capacitor terminals is closed and interrupted electronically — see FIG. 3. In the preferred embodiment of the filter 11 illustrated in that FIG. the contact making elements are constituted by a number n (in the example 8) of transistors T1–T8 which are made conductive one by one by means of a digital circuit. This comprises a pulse generator 17 which via the cable 3 utilizes the modulation control signal of the modulation generator 2 as clock pulse to produce pulses at a frequency eight times that of the modulation control signal. To the pulse generator 17 is connected a binary counter 18 (3 bit) which makes a count from 1 to 8. The digital signal delivered by the counter 18 is decoded by means of decoders 19 to apply a signal successively to eight conductors connected to the bases of the transistr T1–T8 to make each of these conducting for $1/n$ (in the example 1/8) of the modulation period. This switching arrangement is the equivalent of a rotation of the switching arm 13 in FIG. 2 at a frequency equal to the modulation frequency. The connection of the pulse generator 17 to the modulation generator 2 via the cable 3 serves to control this "rotation".

At a microwave frequency in the X-band, e.g. at a frequency of 10 GHz (wavelength about 3 cm) as above mentioned, the physical environment will be practically 100% reflecting and will therefore modify the wave form of the signal received by the receiving antenna 8 in relation to that of the signal emitted by the transmitting antenna 6. However, as long as the environment is in a stationary, undisturbed state, the signal received by the receiving antenna 8 will be constant, but when a moving object occurs in the field of transmission between the transmitting and the receiving antenna, the signal received by the latter will be changed owing to reflection and/or absorption by the moving object. This phenomenon is utilized in the system according to the invention by causing an alarm to be stuck when, and ony when, the signal received by the receiving antenna 8 undergoes changes beyond predetermined conditions in relation to the reference condition defined by the stationary and undisturbed state of the surroundings prevailing at the moment.

For this purpose, the alarm unit 12 may as illustrated in FIG. 4 comprise a detector 20 with zero point displacement, an alarm relay circuit 21 connected to the output of the detector 20, a feed-back circuit 22 including low pass filter means connecting the output of the detector 20 to the amplifier 1o or a stage of that amplifier for automatic gain control purposes, and an alarm device 23, such as a bell or siren and/or a warning light, adapted to be switched on and off by the alarm relay circuit.

The operation of the embodiment of the invention described above is as follows:

The periodic signal produced by the modulation generator, e.g. in the form of a pulse coded signal, is applied to the modulator 4 for modulation of the microwave oscillator 5. Via the transmitting antenna 6 the microwaves produced by the oscillator 5 are emitted towards the receiving antenna 8. This receives the microwave signal as modified by the surroundings and supplies it to the detector 9 for detection. The detected signal is applied to the amplifier 10 which raises it to a suitable level controlled by the low pass filter feed-back circuit 22. The signal is then filtered by the commutative filter 11 and applied to the detector 20 of the alarm unit, which for the reasons previously explained produces an output signal representative of the microwave signal received by the receiving antenna 8. Owing to the low pass filter feed-back circuit 22 this signal will remain at a constant level as long as the modified microwave signal received by the receiving antenna is constant or changes very slowly, e.g. owing to a change of weather conditions, snowfall or the growth of plants in the surveyed area. However, the occurrence of moving objects within the surveyed area will cause the signal received by the receiving antenna to be changed, and thereby the output signal level of the detector 20 to be increased or decreased at a rate which the low pass filter feed-back circuit 22 cannot compensate for, and if the increase or decrease exceeds predetermined limits, the alarm relay circuit will respond to operate the alarm device. Very brief or high frequency changes of the signal received by the receiving antenna, e.g. resulting from birds flying through the surveyed area will be suppressed either by the commutative filter 11 or by a possible slow action of the alarm relay circuit 21, or both, and will therefore not cause the alarm relay circuit 21 to respond. On the other hand, an alarm will be struck, if the output signal of the detector 20 is changed, even slowly, to an extent such that the change can no longer be compensated for by the low pass filter feed-back circuit 22 (which may be indicative of a defect of the system) or in the case of failing current supply (if the alarm device 23 has a current supply of its own).

FIG. 5 illustrates an example of the configuration of the effective survey area that can be obtained by a system according to the invention where the transmitter 1 and the receiver 7 including their respective horn antennae are mounted in closed, weatherproof boxes, the dotted line 24 indicating the borderlines of the effective survey area. The distance between the transmitter 1 and the receiver 7 may typicaly be in the range of 10–300 m.

The system according to the invention is particularly suitable for outdoor use in prisons, military establishments, oil refineries, pipe line areas, official residences, museums, etc..

We claim:

1. A system for detecting moving objects within a survey area by microwave diffraction, comprising:
    a transmitter, said transmitter including a microwave oscillator, a modulator and a transmitting antenna;
    a receiver, said receiver including a receiving antenna, a detector, an amplifier and a commutative filter;
    said filter having a number of capacitors, said capacitors being successively connected, one at a time, into said receiver in a continuous cycle and serving as filter shunt capacitors;
    alarm means connected to the output of said filter; and,
    a modulation generator coupled to both said receiver and said transmitter for providing synchronized control signals to both said modulator and said commutative filter.

2. A system as defined in claim 1, wherein said transmitter and said receiver are coupled by a cable for transmission of the control signals from said modulation generator.

3. A system as defined in claim 1, wherein the modulation control signals are of a rectangular wave type.

4. A system as defined in claim 1, wherein said filter includes cyclic switching means, said switching means is controlled by a digital counter utilizing the modulation generator signals as clock pulses, said switching means switches on each capacitor of the commutative filter during $1/n$ of the modulation period, where n is the number of capacitors.

5. A system as defined in claim 1, wherein said alarm means comprises a detector with zero displacement, an alarm relay circuit controlled by the output of said detector, and a feed-back circuit including a low pass filter connecting the output of the detector to an amplifier stage of said receiver for providing automatic gain control.

6. A system as defined in claim 1, wherein the modulation frequency is within the range of 10–100 kHz.

* * * * *